US012749431B2

(12) United States Patent
Kim et al.

(10) Patent No.: US 12,749,431 B2
(45) Date of Patent: Sep. 29, 2026

(54) DISPLAY DEVICE AND METHOD OF DRIVING THE SAME

(71) Applicant: Samsung Display Co., LTD., Yongin-si (KR)

(72) Inventors: Hyuk Kim, Yongin-si (KR); Jong Hee Kim, Yongin-si (KR); Doo Young Lee, Yongin-si (KR); Chang Soo Lee, Yongin-si (KR); Sang Uk Lim, Yongin-si (KR); Bo Yong Chung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 5 days.

(21) Appl. No.: 18/486,014

(22) Filed: Oct. 12, 2023

(65) Prior Publication Data

US 2024/0127748 A1 Apr. 18, 2024

(30) Foreign Application Priority Data

Oct. 13, 2022 (KR) ........................ 10-2022-0131811

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2320/043* (2013.01)

(58) Field of Classification Search
CPC ............. G09G 3/32; G09G 2310/0267; G09G 2310/0275; G09G 2320/043
See application file for complete search history.

(56) References Cited

U.S. PATENT DOCUMENTS

| | | | | |
|---|---|---|---|---|
| 9,111,491 B2 | 8/2015 | Woo et al. | | |
| 2014/0267215 A1* | 9/2014 | Soni | G09G 3/3233 345/82 |
| 2021/0209989 A1 | 7/2021 | Sung et al. | |
| 2022/0013072 A1* | 1/2022 | Kim | G09G 3/3291 |
| 2022/0415264 A1* | 12/2022 | Lee | G09G 3/3291 |

FOREIGN PATENT DOCUMENTS

| | | | | |
|---|---|---|---|---|
| EP | 3188177 A1 * | 7/2017 | G09G 3/3233 |
| EP | 3789993 A1 * | 3/2021 | G09G 3/3208 |
| KR | 10-1818241 B1 | 1/2018 | |
| KR | 10-2027169 B1 | 10/2019 | |
| KR | 10-2021-0087615 A | 7/2021 | |

* cited by examiner

*Primary Examiner* — Stacy Khoo
(74) *Attorney, Agent, or Firm* — Womble Bond Dickinson (US) LLP

(57) ABSTRACT

A display device includes a scan driver to supply scan signals to first and second scan lines, a data driver to supply a data signal to data lines, a sensor connected to sensing lines, and pixels including a light-emitting element, a driving transistor to control an amount of current supplied to the light-emitting element in response to a voltage of a first node, a switching transistor between a j-th data line and the first node, and including a gate electrode coupled to an i-th first scan line, and a sensing transistor coupled between a second node, which is between the light-emitting element and the driving transistor, and a k-th sensing line, and including a gate electrode coupled to an i-th second scan line, and wherein the sensor is to sense deterioration information of the light-emitting element in a state in which the switching and sensing transistors are turned on.

11 Claims, 10 Drawing Sheets

<DISPLAY PERIOD>

<SENSING PERIOD>

<SENSING PERIOD>

<SENSING PERIOD>

<SENSING PERIOD>

DISPLAY DEVICE AND METHOD OF DRIVING THE SAME

CROSS-REFERENCE TO RELATED APPLICATION

The application claims priority to, and the benefit of, Korean Patent Application No. 10-2022-0131811, filed Oct. 13, 2022, which is hereby incorporated by reference for all purposes as if fully set forth herein.

BACKGROUND

1. Field

The present disclosure relates to a display device and a method of driving the same.

2. Discussion

With the development of information technology, the importance of display devices, which are a connection medium between users and information, has been emphasized. In response to this, the use of display devices, such as a liquid crystal display device, an organic light-emitting display device, and the like has been increasing.

A display device displays an image using a plurality of pixels. Each of the pixels includes a driving transistor and a light-emitting element. A current (e.g., predetermined current) is supplied from the driving transistor to the light-emitting element, and the light-emitting element emits light with a luminance (e.g., predetermined luminance) corresponding to the amount of current supplied thereto.

On the other hand, the light-emitting element may deteriorate depending on the luminance of emitted light and the usage time. Accordingly, the luminance may be set differently in response to the same amount of current. To compensate for this, a method of determining the amount of deterioration of the light-emitting element by accumulating data has been used. However, when the data is accumulated, it may be difficult to accurately determine the amount of deterioration of the light-emitting element.

SUMMARY

An aspect of embodiments of the present disclosure provides a display device capable of determining the amount of deterioration of a light-emitting element by sensing a voltage applied to the light-emitting element, and a method of driving the same.

Another aspect of embodiments of the present disclosure provides a display device capable of determining the amount of deterioration of a light-emitting element regardless of a kickback voltage of transistors, and a method of driving the same.

A display device according to one or more embodiments of the present disclosure may include a display device including a scan driver configured to supply a scan signal to first scan lines and to second scan lines, a data driver configured to supply a data signal to data lines, a sensor connected to sensing lines, and pixels in areas partitioned by the first scan lines, the second scan lines, the data lines, and the sensing lines, wherein at least one of the pixels includes a light-emitting element, a driving transistor configured to control an amount of current supplied to the light-emitting element in response to a voltage of a first node, a switching transistor coupled between a j-th data line and the first node, and including a gate electrode coupled to an i-th first scan line, i and j being natural numbers, and a sensing transistor coupled between a second node, which is between the light-emitting element and the driving transistor, and a k-th sensing line, and including a gate electrode coupled to an i-th second scan line, k being a natural number, and wherein the sensor is configured to sense deterioration information of the light-emitting element in a state in which the switching transistor and the sensing transistor are turned on.

The data driver may be configured to supply a voltage of a reference power source having a voltage value at which the driving transistor is turned on to the j-th data line during a period in which the deterioration information is sensed.

The voltage value of the reference power source may be set so that the light-emitting element emits light due to a current from the driving transistor when the voltage of the reference power source is supplied to the first node.

The scan driver may be configured to supply a first scan signal to the i-th first scan line, and may be configured to supply a second scan signal to the i-th second scan line, during a period in which the deterioration information is sensed.

The scan driver may be configured to concurrently stop supplying the first scan signal and the second scan signal after the deterioration information is sensed.

The i-th first scan line and the i-th second scan line may include a same scan line.

The scan driver may be configured to stop supply of the first scan signal and the second scan signal at different respective time points after the deterioration information is sensed.

The sensor may include sensing channels for sensing the deterioration information, at least one of the sensing channels including a sensing capacitor including a first electrode coupled to a base power source, and a second electrode, a first switch coupled between the k-th sensing line and an initialization power source, and a second switch coupled between the k-th sensing line and the second electrode of the sensing capacitor.

The display device may further include an analog-to-digital converter coupled to the second electrode of the sensing capacitor.

The first switch may be configured to be maintained in a turned-on state for a part of a period in which the first scan signal and the second scan signal are supplied, and may be configured to be set to a turned-off state for a remainder of the period in which the first scan signal and the second scan signal are supplied.

The deterioration information of the light-emitting element may be configured to be sensed at a corresponding time point during a period in which the first switch is set to the turned-off state.

The second switch may be configured to be turned off during the part of the period in which the first scan signal and the second scan signal are supplied, and to be turned on during the remainder of the period in which the first scan signal and the second scan signal are supplied.

A period in which the second switch is turned on may partially overlap a period in which the first switch is turned on, wherein the second switch is configured to be maintained in the turned-on state for the remainder of the period in which the first scan signal and the second scan signal are supplied.

A display device according to one or more other embodiments of the present disclosure may include a scan driver configured to drive first scan lines and second scan lines, a data driver configured to drive data lines, a sensor configured to drive sensing lines, and a pixel including a light-emitting element, a driving transistor configured to control an amount of current supplied to the light-emitting element, a switching transistor coupled between a corresponding data line among the data lines and the driving transistor, and a sensing transistor coupled between the light-emitting element and a corresponding sensing line among the sensing lines, wherein the sensor is configured to sense deterioration information of the light-emitting element in a state in which the switching transistor and the sensing transistor are turned on.

A method of driving a display device according to one or more embodiments of the present disclosure may include supplying a voltage of a reference power source to a first node through a data line and a switching transistor, supplying a voltage of an initialization power source to a first electrode of a light-emitting element during a part of a period in which the voltage of the reference power source is supplied, supplying a current from a driving transistor to the light-emitting element in response to the voltage of the reference power source supplied to the first node during a remainder of the period in which the voltage of the reference power source is supplied, and sensing a voltage applied to the first electrode of the light-emitting element through a sensing transistor coupled between a sensing line and the first electrode of the light-emitting element by maintaining the switching transistor and the sensing transistor in a turned-on state.

The method may further include generating light by the light-emitting element by supplying the current from the driving transistor to the light-emitting element.

The method may further include setting the voltage of the initialization power source such that the light-emitting element does not emit light.

The method may further include concurrently turning off the switching transistor and the sensing transistor after sensing the voltage applied to the first electrode of the light-emitting element.

The method may further include turning off the switching transistor and the sensing transistor at different respective time points after sensing the voltage applied to the first electrode of the light-emitting element.

BRIEF DESCRIPTION OF THE DRAWINGS

The accompanying drawings, which are included to provide a further understanding of the present disclosure, and are incorporated in and constitute a part of this specification, illustrate embodiments of the present disclosure, and, together with the description, serve to explain aspects of the present disclosure.

DETAILED DESCRIPTION

Figure 1:
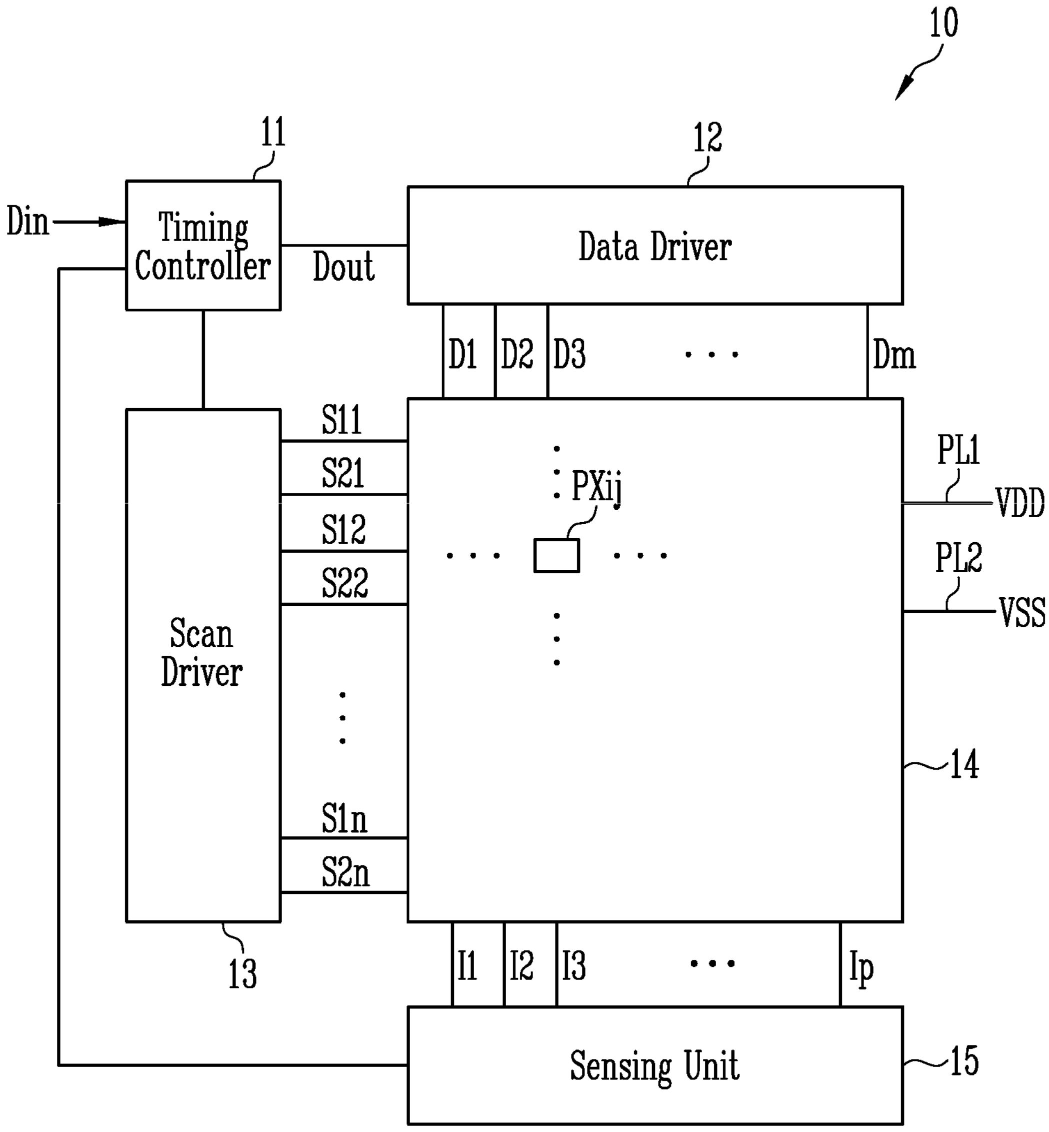
FIG. 1 is a diagram illustrating a display device according to one or more embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In addition, the size and thickness of each component shown in the drawings are arbitrarily shown for convenience of description, and thus the present disclosure is not necessarily limited to those shown in the drawings. In the drawings, thicknesses may be exaggerated to clearly express the layers and regions.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

For the purposes of this disclosure, expressions such as “at least one of,” or “any one of,” when preceding a list of elements, modify the entire list of elements and do not modify the individual elements of the list. For example, “at least one of X, Y, and Z,” “at least one of X, Y, or Z,” “at least one selected from the group consisting of X, Y, and Z,” and “at least one selected from the group consisting of X, Y, or Z” may be construed as X only, Y only, Z only, any combination of two or more of X, Y, and Z, such as, for instance, XYZ, XYY, YZ, and ZZ, or any variation thereof. Similarly, the expression such as “at least one of A and B”

and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device according to one or more embodiments of the present disclosure.

Referring FIG. 1, a display device 10 according to one or more embodiments of the present disclosure may include a timing controller 11, a data driver 12, a scan driver 13, a display (e.g., a pixel unit) 14, and a sensor (e.g., a sensing unit) 15.

The timing controller 11 may receive input data Din and control signals corresponding to each frame from an external processor. Here, the processor may include at least one of a graphics processing unit (GPU), a central processing unit (CPU), an application processor (AP), and the like.

The timing controller 11 may correct the input data Din to generate output data Dout, and may supply the output data Dout to the data driver 12. Here, the timing controller 11 may generate the output data Dout by correcting the input data Din so that deterioration of a light-emitting element included in each of pixels PX can be compensated.

Additionally, the timing controller 11 may generate the output data Dout by correcting the input data Din by reflecting threshold voltage and/or mobility information of a driving transistor included in each of the pixels PX, optical measurement results measured during processes, and the like. In addition, the timing controller 11 may provide control signals suitable for specifications of each of the data driver 12, the scan driver 13, and the sensor 15.

During a display period, the data driver 12 may generate a data signal (or a data voltage) to be supplied to data lines D1 to Dm in response to the output data Dout and the control signals supplied from the timing controller 11, where "m" may be a natural number. The data driver 12 may supply the data signal to the data lines D1 to Dm in units of pixel rows (or horizontal lines). Here, a pixel row may mean a location of pixels connected to the same scan line.

As an example, the data signal supplied to the data lines D1 to Dm may be supplied to pixels selected by a first scan signal. To this end, the data driver 12 may supply the data signal to the data lines D1 to Dm in synchronization with the first scan signal.

During a sensing period, the data driver 12 may supply a voltage of a reference power source to the data lines D1 to Dm. Here, the voltage of the reference power source may be set to a voltage at which the driving transistor included in each of the pixels PX is turned on.

The scan driver 13 may supply the first scan signal to first scan lines S11 to S1*n*, and may supply a second scan signal to second scan lines S21 to S2*n*, in response to the control signals from the timing controller 11, where "n" may be a natural number.

For example, the scan driver 13 may sequentially supply the first scan signal having a gate-on voltage (or turn-on level) to the first scan lines S11 to S1*n*. In addition, the scan driver 13 may sequentially supply the second scan signal having a gate-on voltage (or turn-on level) to the second scan lines S21 to S2*n*. Meanwhile, FIG. 1 shows one or more embodiments in which one scan driver 13 drives the first scan lines S11 to S1*n* and the second scan lines S21 to S2*n*, but the present disclosure is not limited thereto. For example, each of the first scan lines S11 to S1*n* and the second scan lines S21 to S2*n* may receive scan signals from different respective scan drivers.

During the display period, when the first scan signal and the second scan signal are sequentially supplied, the pixels PX may be selected in units of pixel rows. The pixels selected during the display period may receive the data signal, and may generate light having a luminance (e.g., predetermined luminance) in response to the data signal.

During the sensing period, when the first scan signal and the second scan signal are sequentially supplied, the pixels PX may be selected in units of pixel rows. During the sensing period, the amount of deterioration of the light-emitting element (e.g., deterioration amount information, or deterioration information) may be sensed from the selected pixels as sensing information. Additionally, during the sensing period, the threshold voltage and/or mobility information of the driving transistor may be further sensed from the pixels.

The sensor 15 may supply a voltage of an initialization power source to sensing lines l1 to lP, or may sense the sensing information from the pixels connected to the sensing lines l1 to lp, where "p" may be a natural number.

During the display period, the sensor 15 may supply the voltage of the initialization power source to the sensing lines l1 to lp. During the sensing period, the sensor 15 may supply the voltage of the initialization power source to the sensing lines l1 to lp during a partial period, and may receive the sensing information from the pixels PX connected to the sensing lines l1 to lp during the remaining period.

The display 14 may include the pixels PX. Each of the pixels PX may be connected to a first power source line PL1 and a second power source line PL2. The pixels PX may supply a first power source VDD through the first power source line PL1, and may receive a second power source VSS through the second power source line PL2. The first power source VDD may be set to a higher voltage level than the second power source VSS.

The first power source line PL1 may be commonly connected to the pixels PX to supply the first power source VDD to the pixels PX. The second power source line PL2 may be commonly connected to the pixels PX to supply the second power source VSS to the pixels PX. However, the connection relationship between the power source lines PL1 and PL2 and the pixels PX is not limited thereto. As an example, a plurality of first power source lines PL1 may be connected to different pixels. As another example, a plurality of second power source lines PL2 may be connected to different pixels.

Each of the pixels PX may include a plurality of transistors and at least one light-emitting element. The pixels PX may be selected when a scan signal is supplied to a scan line connected thereto, and receive a data signal from a data line. Each of the pixels PX receiving the data signal may emit light of a luminance (e.g., predetermined luminance) in response to the data signal.

Figure 2:
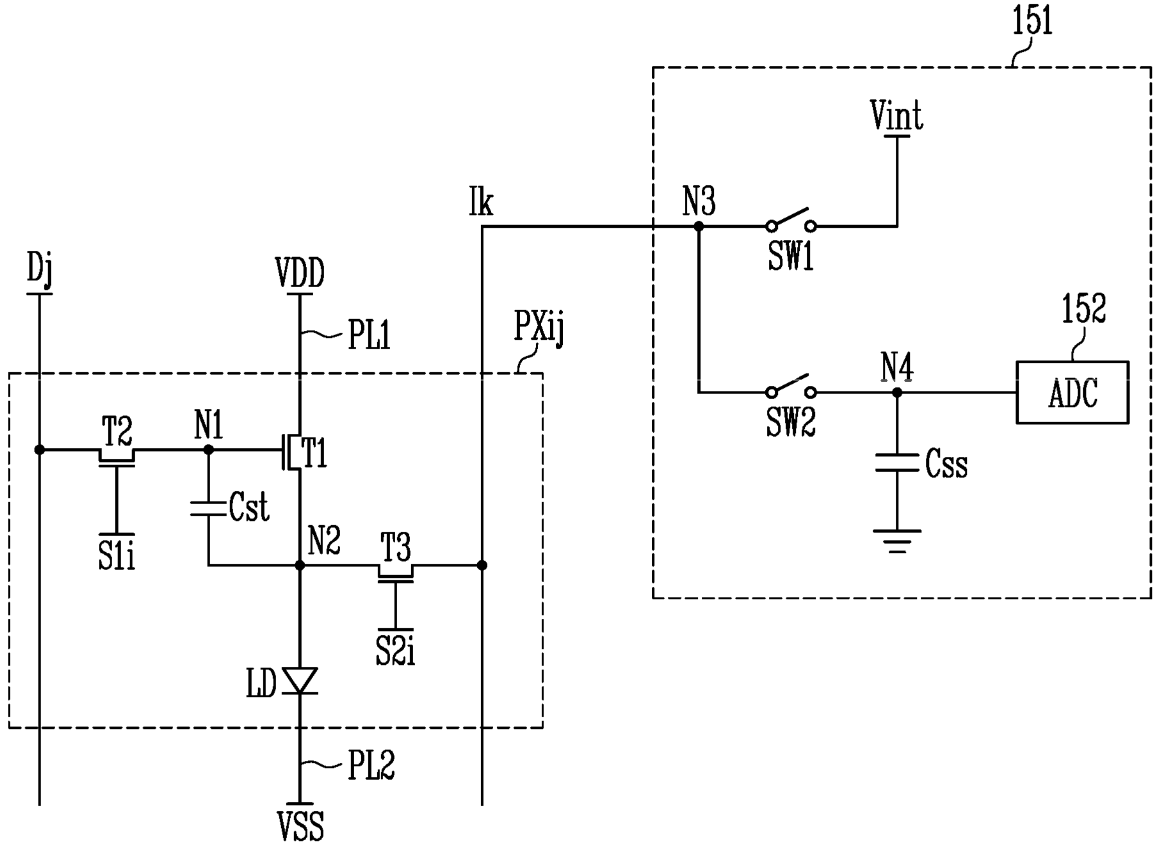
FIG. 2 is a diagram for explaining a pixel and a sensing channel according to one or more embodiments of the present disclosure.

FIG. 2 is a diagram for explaining a pixel and a sensing channel according to one or more embodiments of the present disclosure. FIG. 2 shows a pixel located on an i-th horizontal line and a j-th vertical line, where "i" and "j" may be natural numbers.

Referring to FIG. 2, a pixel PXij according to one or more embodiments of the present disclosure may include transistors T1 to T3, a storage capacitor Cst, and a light-emitting element LD.

The light-emitting element LD may be connected between the first power source line PL1, to which the first power source VDD is supplied, and the second power source line PL2, to which the second power source VSS is supplied. For example, a first electrode (for example, an anode electrode) of the light-emitting element LD may be connected to the first power source line PL1 through a second node N2 and a first transistor T1, and a second electrode (for example, a cathode electrode) of the light-emitting element LD may be connected to the second power source line PL2. The light-emitting element LD may emit light with a luminance corresponding to the amount of current supplied from the first transistor T1.

A voltage of the first power source VDD and a voltage of the second power source VSS may have a potential difference (e.g., predetermined potential difference) so that the light-emitting element LD emits light. For example, the first power source VDD may be a high-potential power source having a higher voltage than the second power source VSS, and the second power source VSS may be a lower-potential power source having a lower voltage than the first power source VDD.

An organic light-emitting diode may be selected as the light-emitting element LD. In addition, an inorganic light-emitting diode, such as a micro light-emitting diode (LED) or a quantum dot light-emitting diode may be selected as the light-emitting element LD. In addition, the light-emitting element LD may be an element composed of a combination of an organic material and an inorganic material. FIG. 2 shows one or more embodiments in which a pixel PX includes a single light-emitting element LD. However, in one or more other embodiments, the pixel PX may include a plurality of light-emitting elements, and the plurality of light-emitting elements may be connected in series, in parallel, or in series and parallel.

The transistors T1, T2, and T3 may be composed of N-type transistors. In one or more other embodiments, the transistors T1, T2, and T3 may be composed of P-type transistors. In one or more other embodiments, the transistors T1, T2, and T3 may be composed of a combination of an N-type transistor and a P-type transistor. A P-type transistor may generally refer to a transistor in which the amount of current increases by being conducted when a voltage difference between a gate electrode and a source electrode increases in a negative direction. An N-type transistor may generally refer to a transistor in which the amount of current increases by being conducted when a voltage difference between a gate electrode and a source electrode increases in a positive direction.

The transistors may be configured in various forms, such as a thin film transistor (TFT), a field effect transistor (FET), a bipolar junction transistor (BJT), and the like.

The first transistor T1 may be connected between the first power source line PL1 and the second node N2. A gate electrode of the first transistor T1 may be connected to a first node N1. The first transistor T1 may control the amount of current supplied from the first power source VDD to the second power source VSS via the light-emitting element LD in response to a voltage of the first node N1. The first transistor T1 may be referred to as a driving transistor.

A second transistor T2 may be connected between a data line Dj and the first node N1. A gate electrode of the second transistor T2 may be connected to a first scan line S1*i*. The second transistor T2 may be turned on when the first scan signal is supplied to the first scan line S1*i* to electrically connect the data line Dj to the first node N1. The second transistor T2 may be referred to as a switching transistor.

A third transistor T3 may be connected between the second node N2 and a sensing line lk, where "k" may be a natural number. A gate electrode of the third transistor T3 may be connected to a second scan line S2*i*. The third transistor T3 may be turned on when the second scan signal is supplied to the second scan line S2*i* to electrically connect the sensing line lk to the second node N2. The third transistor T3 may be referred to as a sensing transistor.

The storage capacitor Cst may be connected between the first node N1 and the second node N2. The storage capacitor Cst may store a voltage corresponding to a difference between the voltage of the first node N1 and a voltage of the second node N2.

A sensing channel 151 may include a first switch SW1, a second switch SW2, a sensing capacitor Css, and an analog-to-digital converter 152 (hereinafter referred to as "ADC").

The first switch SW1 may be connected between a third node N3 connected to the sensing line lk and an initialization power source Vint. The first switch SW1 may be turned on or off in response to a control signal supplied from the timing controller 11 to the sensor 15. When the first switch SW1 is turned on, a voltage of the initialization power source Vint may be supplied to the sensing line Ik through the third node N3.

The second switch SW2 may be connected between the third node N3 and a fourth node N4. The second switch SW2 may be turned on or off in response to the control signal supplied from the timing controller 11 to the sensor 15. When the second switch SW2 is turned on, the third node N3 and the fourth node N4 may be electrically connected to each other.

A second electrode of the sensing capacitor Css may be connected to the fourth node N4 and a first electrode of the sensing capacitor Css may be connected to a base power source (for example, ground). The sensing capacitor Css may store a voltage of the fourth node N4.

The ADC 152 may be connected to the fourth node N4. The ADC 152 may convert a voltage (for example, a sensing voltage) applied to the fourth node N4 into a digital value, and may supply the digital value to the timing controller 11. Here, the digital value supplied from the ADC 152 to the timing controller 11 may include deterioration information of the light-emitting element LD as the sensing information.

In one or more embodiments, the ADC 152 may be located each sensing channel 151. In this case, the sensor 15 may include ADCs 152 corresponding to the number of sensing channels 151. In one or more other embodiments, the ADC 152 may be positioned to share a plurality of sensing channels 151. In this case, the ADC 152 may implement time-division and may convert sensing voltages of the plurality of sensing channels 151.

Figure 3:
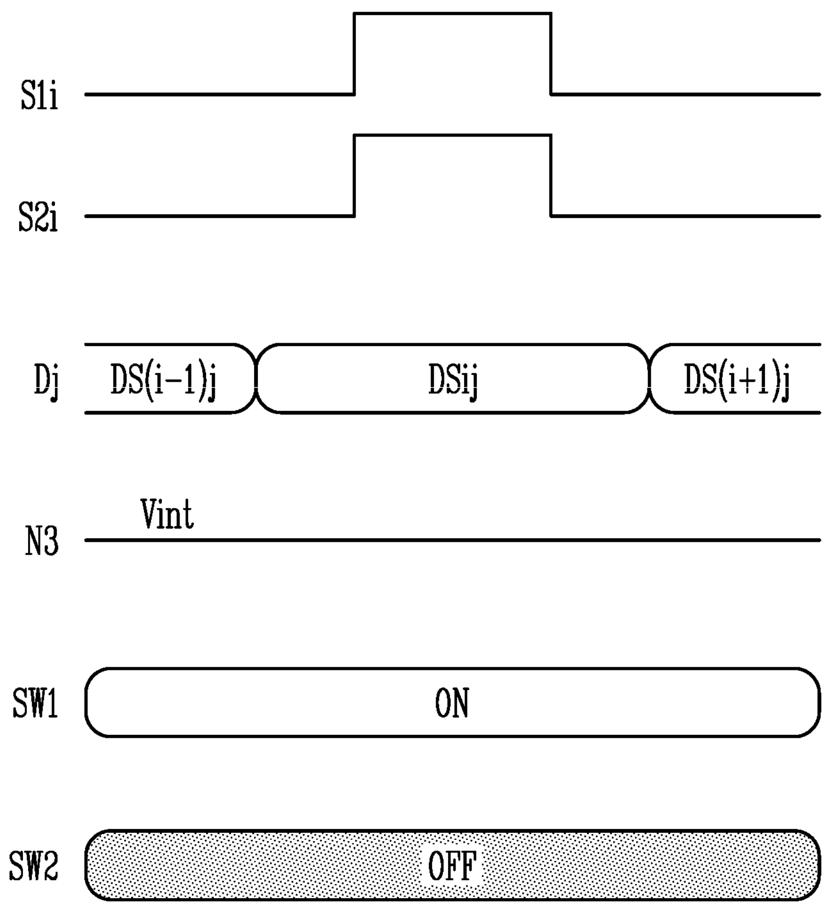
FIG. 3 is a diagram for explaining a display period according to one or more embodiments of the present disclosure.

FIG. 3 is a diagram for explaining a display period according to one or more embodiments of the present disclosure.

Referring to FIGS. 2 and 3, during the display period, the sensing line Ik, that is, the third node N3 may receive the voltage of the initialization power source Vint. To this end, during the display period, the first switch SW1 may be set to a turned-on state, and the second switch SW2 may be set to a turned-off state.

During the display period, data signals DS(i−1)j, DSij, and DS(i+1)j may be sequentially supplied to the data line Dj in units of pixel rows. In a corresponding pixel row, the first scan signal may be supplied to the first scan line S1*i* and the second scan signal may be supplied to the second scan line S2*i*.

When the first scan signal is supplied to the first scan line S1*i*, the second transistor T2 may be turned on. When the second transistor T2 is turned on, a data signal DSij may be supplied from the data line Dj to the first node N1. When the second scan signal is supplied to the second scan line S2*i*, the third transistor T3 may be turned on. When the third transistor T3 is turned on, the voltage of the initialization power source Vint may be supplied to the second node N2 through the first switch SW1, the third node N3, the sensing line Ik, and the third transistor T3. In this case, a voltage corresponding to a difference between the voltage of the first node N1 and the voltage of the second node N2 may be stored in the storage capacitor Cst. Here, the initialization power source Vint supplied to the second node N2 may be set to, or maintained at, a constant voltage. Accordingly, the voltage stored in the storage capacitor Cst may be determined by a voltage of the data signal DSij.

After the voltage corresponding to the data signal DSij is stored in the storage capacitor Cst, the supply of the first scan signal to the first scan line S1*i* is stopped so that the second transistor T2 may be turned off, and the supply of the second scan signal to the second scan line S2*i* is stopped so that the third transistor T3 may be turned off. Thereafter, the first transistor T1 may supply a current corresponding to the voltage stored in the storage capacitor Cst to the light-emitting element LD, and the light-emitting element LD may generate light having a luminance (e.g., predetermined luminance) corresponding to the amount of current supplied thereto.

Figure 4:
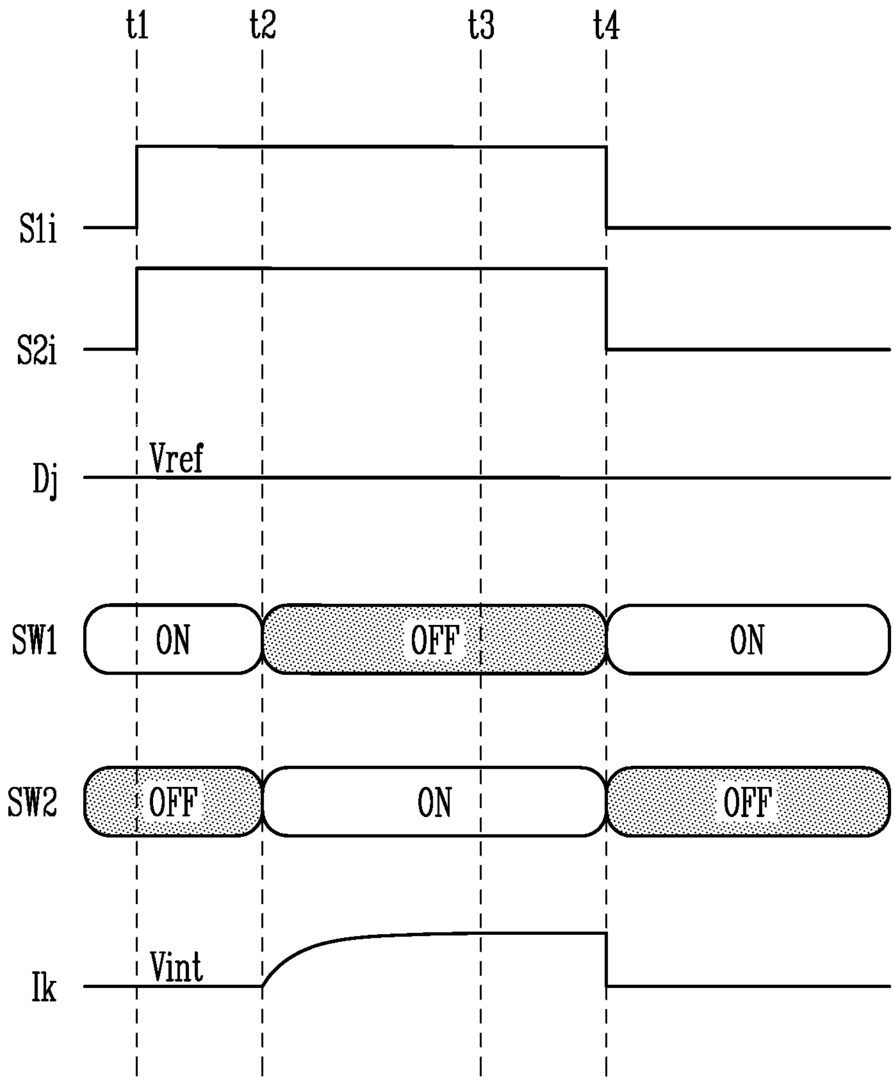
FIG. 4 is a diagram for explaining a sensing period according to one or more first embodiments of the present disclosure.

FIG. 4 is a diagram for explaining a sensing period according to one or more first embodiments of the present disclosure. FIG. 4 is a diagram for explaining a process of sensing deterioration of the light-emitting element.

Referring to FIG. 4, during the sensing period of sensing deterioration of the light-emitting element, a voltage of a reference power source Vref may be supplied to the data line Dj. Here, the voltage of the reference power source Vref may be set so that the first transistor T1 (or driving transistor) included in each of the pixels PX is turned on. As an example, the voltage of the reference power source Vref may be set such that current flows from the first power source VDD to the second power source VSS through the first transistor T1 and the light-emitting element LD. In other words, the voltage of the reference power source Vref may be set so that the light-emitting element LD emits light with a luminance (e.g., predetermined luminance).

During a period between a first time point t1 to a fourth time point t4, the first scan signal may be supplied to the first scan line S1*i*, and the second scan signal may be supplied to the second scan line S2*i*.

During a period between the first time point t1 to the fourth time point t4 when the first scan signal is supplied to the first scan line S1*i*, the second transistor T2 may be turned on. When the second transistor T2 is turned on, the data line Dj and the first node N1 may be electrically connected to each other. In this case, the voltage of the reference power source Vref may be supplied from the data line Dj to the first node N1.

During a period between the first time point t1 to the fourth time point t4 when the second scan signal is supplied to the second scan line S2*i*, the third transistor T3 may be turned on. When the third transistor T3 is turned on, the second node N2 and the sensing line Ik (or the third node N3) may be electrically connected to each other.

At the first time point t1, the first switch SW1 may be turned on, and the second switch SW2 may be maintained in the turned-off state. When the first switch SW1 is turned on, the voltage of the initialization power source Vint may be supplied to the second node N2 through the third node N3, the sensing line Ik, and the third transistor T3. Then, a voltage corresponding to a difference between the voltage of the reference power source Vref and the voltage of the initialization power source Vint may be stored in the storage capacitor Cst. Here, the voltage of the initialization power source Vint may be set to turn off the light-emitting element LD. Accordingly, during a period between the first time point t1 and the second time point t2 when the voltage of the initialization power source Vint is supplied to the second node N2, the light-emitting element LD may be maintained in a turned-off state.

At the second time point t2, the first switch SW1 may be turned off and the second switch SW2 may be turned on. When the second switch SW2 is turned on, the third node N3 and the fourth node N4 may be electrically connected to each other. When the first switch SW1 is turned off, the voltage of the initialization power source Vint may not be supplied to the third node N3 (or the sensing line lk).

Meanwhile, at the second time point t2, the first transistor T1 may supply a current corresponding to the voltage stored in the storage capacitor Cst to the second power source VSS through the second node N2 and the light-emitting element LD. In this case, the light-emitting element LD may emit light with a luminance (e.g., predetermined luminance).

After the second time point t2, the voltage of the second node N2 may increase corresponding to the amount of current supplied from the first transistor T1. In this case, the voltage of the first node N1, which is set to a floating state and coupled with the second node N2, may also increase. Accordingly, the first transistor T1 may be stably maintained in a turned-on state. Thereafter, the voltage of the second node N2 may be saturated to a voltage corresponding to a threshold voltage of the light-emitting element LD. Here, the threshold voltage of the light-emitting element LD may be changed in response to deterioration of the light-emitting element LD. Accordingly, the amount of deterioration of the light-emitting element LD may be determined using the voltage of the second node N2.

The voltage of the second node N2 may be supplied to the fourth node N4 through the sensing line lk and the second switch SW2. In this case, the sensing capacitor Css may store the voltage of the fourth node N4.

After the voltage of the second node N2 is saturated to a voltage corresponding to the threshold voltage of the light-emitting element LD, the voltage of the fourth node N4 may be converted to a digital value by the ADC 152 at a third time point t3. The digital value generated by the ADC 152 may be supplied to the timing controller 11 as the sensing information.

At the fourth time point t4, the supply of the first scan signal to the first scan line S1*i* may be stopped, and the supply of the second scan signal to the second scan line S2*i* may be stopped. When the supply of the first scan signal to the first scan line S1*i* is stopped, the second transistor T2 may be turned off. When the supply of the second scan signal to the second scan line S2*i* is stopped, the third transistor T3 may be turned off. Also, at the fourth time point t4, the first switch SW1 may be turned on and the second switch SW2 may be turned off.

When the first switch SW1 is turned on, the voltage of the initialization power source Vint may be supplied to the sensing line lk. Accordingly, the sensing line lk may be initialized with the voltage of the initialization power source Vint. However, a time point at which the voltage of the initialization power source Vint is supplied to the sensing line lk after the fourth time point t4 may not be limited to the above-described time point and may be set in various ways. As an example, the first switch SW1 may be turned on and the second switch SW2 may be turned off in a corresponding period after the fourth time point t4.

In the sensing period according to the one or more first embodiments of the present disclosure described above, the second transistor T2 and the third transistor T3 may be maintained in a turned-on state prior to the time point (for example, t3) at which the sensing information of the light-emitting element LD is extracted. In this case, a change in the voltage of the first node N1 and/or the third node N3, which may be due to a kickback voltage generated when the second transistor T2 and/or the third transistor T3 is turned off, may be reduced or prevented. Accordingly, the amount of deterioration of the light-emitting element LD can be accurately sensed. In addition, when the amount of deterioration of the light-emitting element LD is accurately sensed, the timing controller 11 may more accurately compensate for the deterioration of the light-emitting element LD. Accordingly, afterimage compensation capability (or display quality) can be improved.

Additionally, in the one or more first embodiments of the present disclosure, supply timings of the first scan signal supplied to the first scan line S1*i* and the second scan signal supplied to the second scan line S2*i* may be set to be the same. In this case, the second scan line S2*i* may be removed, and the second transistor T2 and the third transistor T3 may be driven using the first scan line S1*i*. In other words, the first scan line S1*i* and the second scan line S2*i* may be set as one scan line. Accordingly, freedom of design (or reduction or minimization of dead space) can be secured.

Figure 5:
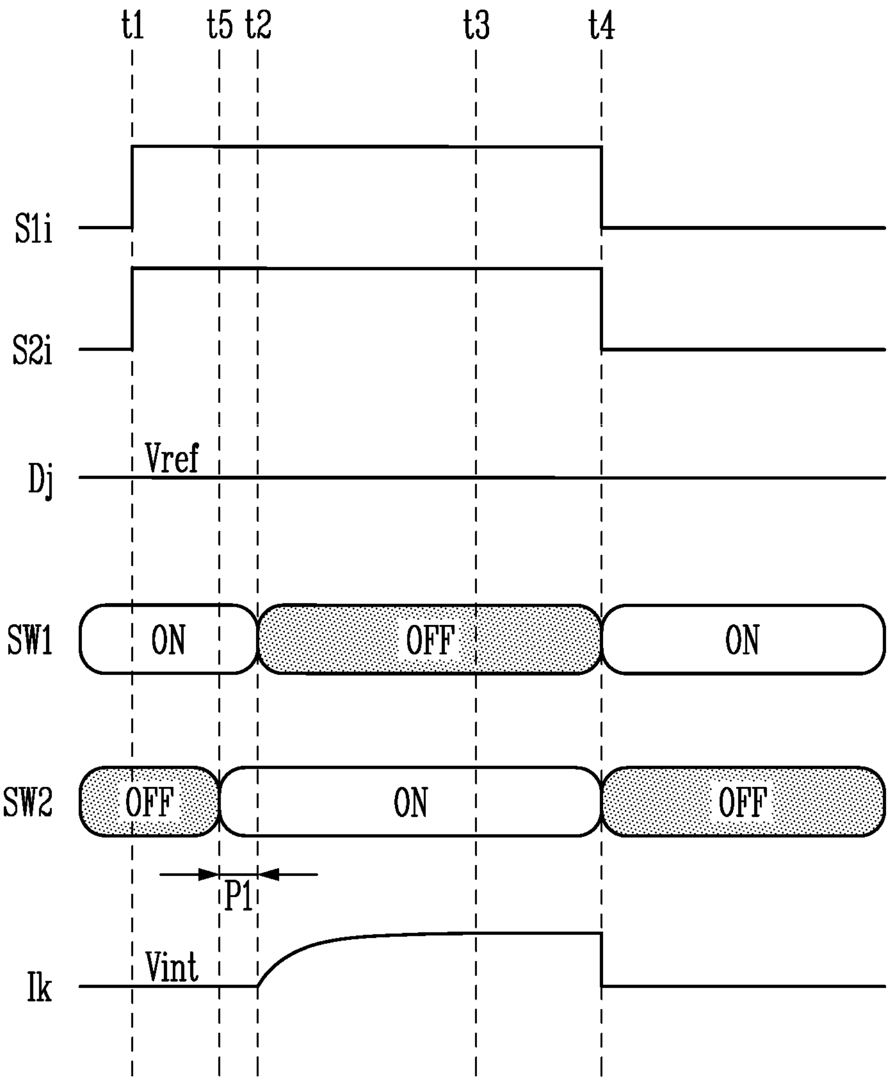
FIG. 5 is a diagram for explaining a sensing period according to one or more second embodiments of the present disclosure.

FIG. 5 is a diagram for explaining a sensing period according to one or more second embodiments of the present disclosure. In describing FIG. 5, repeated overlapping descriptions of the same parts as those of FIG. 4 will be omitted.

Referring to FIG. 5, during the sensing period according to the one or more second embodiments of the present disclosure, at a fifth time point t5 between the first time point t1 and the second time point t2, the second switch SW2 may be turned on. When the second switch SW2 is turned on, the third node N3 and the fourth node N4 may be electrically connected to each other. Then, the voltage of the initialization power source Vint supplied to the third node N3 may be supplied to the fourth node N4. Accordingly, the sensing capacitor Css may be initialized.

That is, in the one or more second embodiments of the present disclosure, during a period P1 between the fifth time point t5 and the second time point t2, turn-on periods of the first switch SW1 and the second switch SW2 may overlap each other. Accordingly, the sensing capacitor Css may be initialized.

Figure 6:
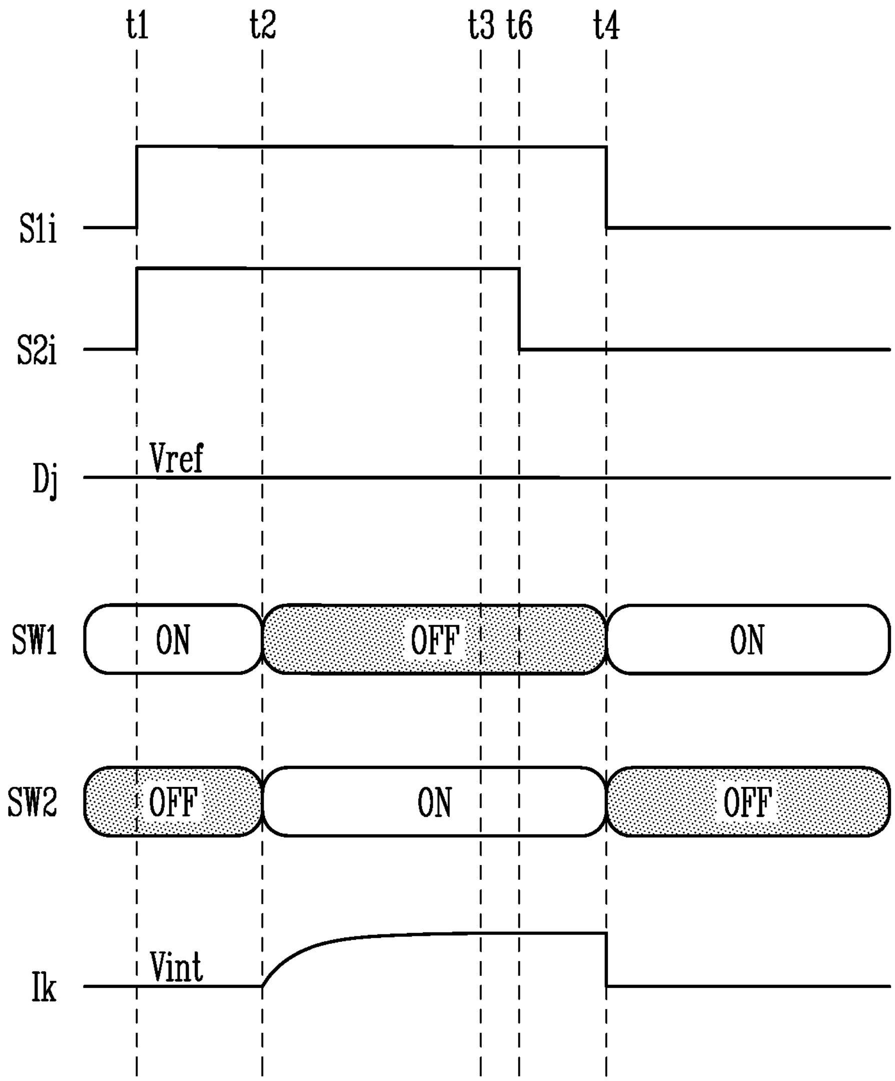
FIG. 6 is a diagram for explaining a sensing period according to one or more third embodiments of the present disclosure.
Figure 7:
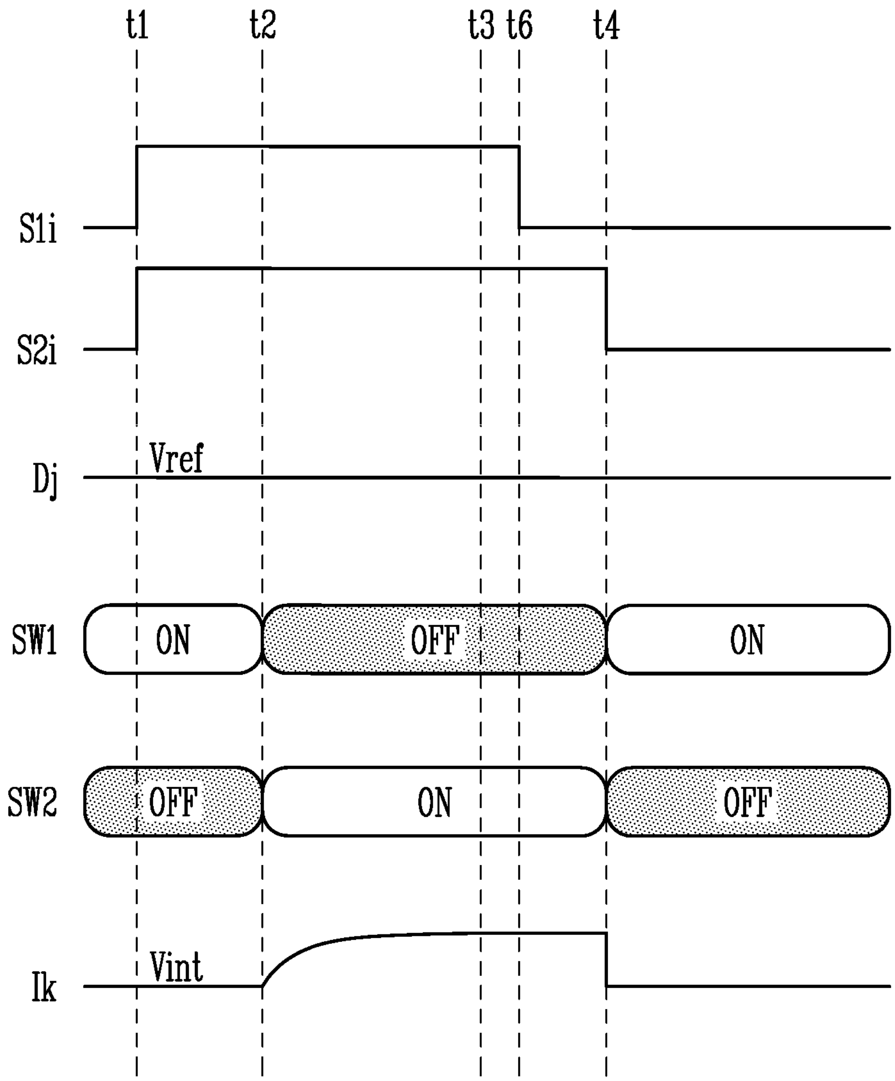
FIG. 7 is a diagram for explaining a sensing period according to one or more fourth embodiments of the present disclosure.

FIG. 6 is a diagram for explaining a sensing period according to one or more third embodiments of the present disclosure. FIG. 7 is a diagram for explaining a sensing period according to one or more fourth embodiments of the present disclosure.

In describing FIGS. 6 and 7, repeated overlapping descriptions of the same parts as those of FIG. 4 will be omitted.

Referring to FIGS. 4, 6, and 7, as described above, in the embodiments of the present disclosure, the sensing information of the light-emitting element LD may be generated at the third time point t3 when the second transistor T2 and the third transistor T3 are maintained in the turned-on state. In this case, a change in the sensing information due to the kickback voltage generated when the second transistor T2 and the third transistor T3 are turned off may be reduced or prevented.

Meanwhile, after the third time point t3, turn-off time points of the second transistor T2 and the third transistor T3 may be freely set. As an example, as shown in FIG. 6, at a sixth time point t6 between the third time point t3 and the fourth time point t4, the supply of the second scan signal may be stopped so that the third transistor T3 may be turned off. Thereafter, at the fourth time point t4, the supply of the first scan signal may be stopped so that the second transistor T2 may be turned off.

As one or more other embodiments, as shown in FIG. 7, at the sixth time point t6 between the third time point t3 and the fourth time point t4, the supply of the first scan signal may be stopped so that the second transistor T2 may be turned off. Thereafter, at the fourth time point t4, the supply of the second scan signal may be stopped so that the third transistor T3 may be turned off.

Figure 8:
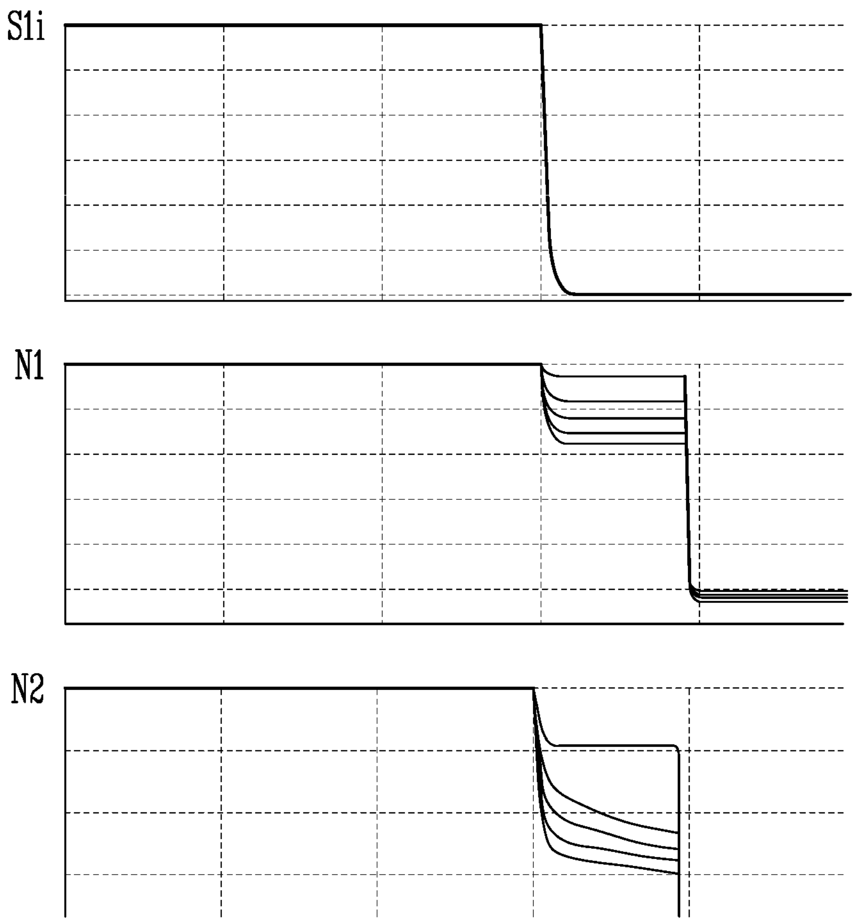
FIG. 8 is a diagram illustrating the amount of change in voltage at a first node due to a kickback voltage.

FIG. 8 is a diagram illustrating the amount of change in voltage at a first node due to a kickback voltage.

Referring to FIG. 8, when the supply of the scan signal to the first scan line S1*i* is stopped, the second transistor T2 may be turned off. When the second transistor T2 is turned off, the voltage of the first node N1 may be changed by the kickback voltage. Here, a value of the kickback voltage may be set differently depending on the material characteristics of the transistors, the capacitance of a parasitic capacitor formed at the first node N1, and the like. As an example, the voltage of the first node N1 may be variously changed by the kickback voltage according to the turn-off of the second transistor T2.

When the voltage of the first node N1 is changed by the kickback voltage, the voltage of the second node N2 may also be changed by the coupling. Therefore, when the deterioration information of the light-emitting element LD is sensed after the second transistor T2 is turned off, the amount of deterioration of the light-emitting element LD might not be accurately determined.

Figure 9:
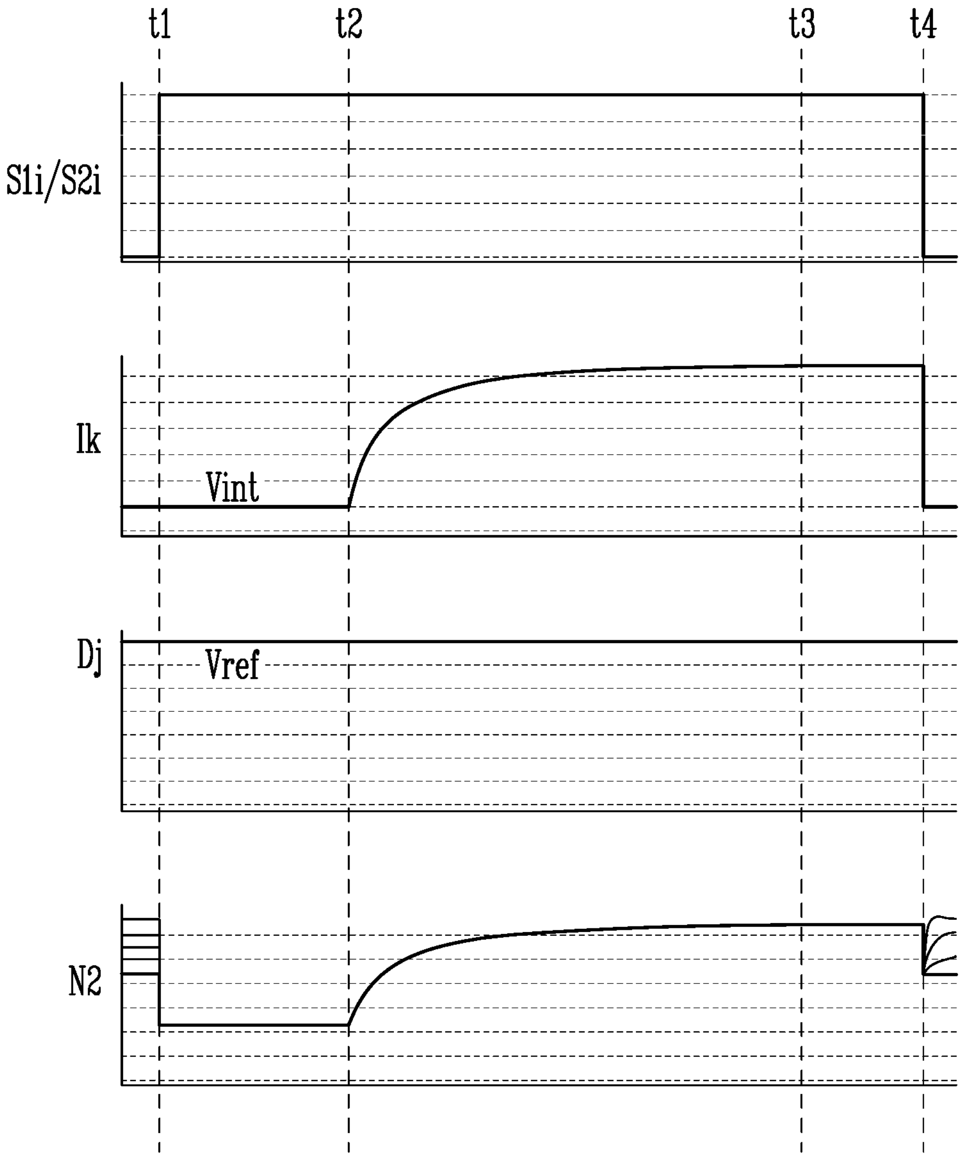
FIG. 9 is a diagram showing simulation results using driving waveforms of FIG. 4.

FIG. 9 is a diagram showing simulation results using driving waveforms of FIG. 4.

Referring to FIG. 9, in the present disclosure, the deterioration information of the light-emitting element LD may be sensed at the third time point t3 when the second transistor T2 and the third transistor T3 are maintained in the turned-on state. In this case, the voltage of the second node N2 may be stably maintained at a constant voltage (for example, a voltage corresponding to deterioration of the light-emitting element). Accordingly, the deterioration information of the light-emitting element LD can be accurately sensed.

Figure 10:
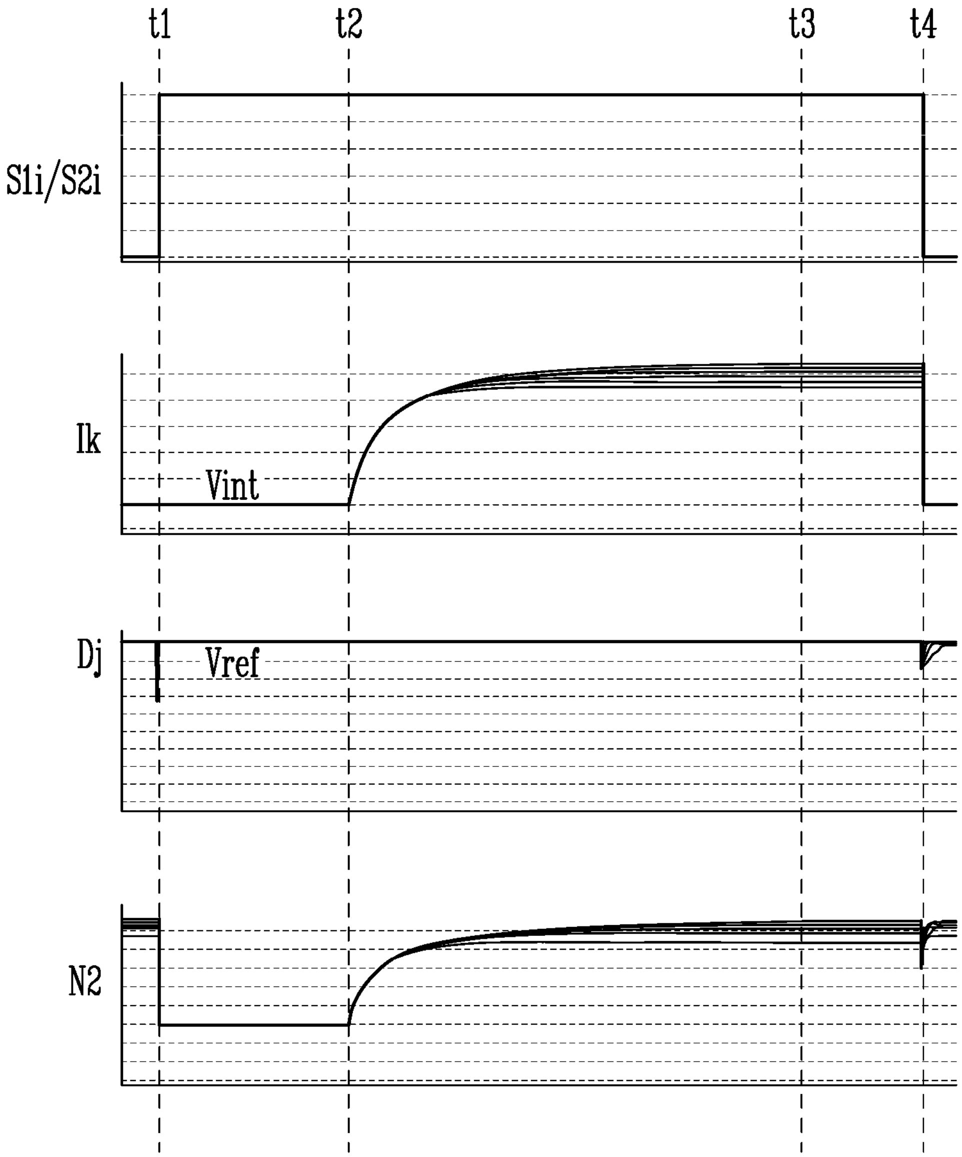
FIG. 10 is a diagram illustrating voltages applied to a light-emitting element according to deterioration of the light-emitting element.

FIG. 10 is a diagram illustrating voltages applied to a light-emitting element according to deterioration of the light-emitting element. FIG. 10 shows a case of being driven by the driving waveforms of FIG. 4.

Referring to FIG. 10, when the light-emitting element LD is deteriorated, the voltage of the second node N2 may be changed corresponding to the deterioration of the light-emitting element LD. Accordingly, the voltage of the fourth node N4 electrically connected to the second node N2 through the third transistor T3, the third node N3, and the second switch SW2 may also be changed in response to the voltage of the second node N2. Accordingly, the deterioration information of the light-emitting element LD can be sensed.

According to the display device and the method of driving the same according to the embodiments of the present disclosure, during the sensing period, the amount of deterioration of the light-emitting element may be determined regardless of the kickback voltage of the transistors. Accordingly, an afterimage can be accurately compensated.

However, aspects of the present disclosure are not limited to the above-described aspects, and may be variously extended without departing from the spirit and scope of the present disclosure.

As described above, preferred embodiments of the present disclosure have been described with reference to the drawings. However, those skilled in the art will appreciate that various modifications and changes can be made to the present disclosure without departing from the spirit and scope of the present disclosure as set forth in the appended claims, with functional equivalents thereof to be included therein.

What is claimed is:

1. A display device comprising:

a scan driver configured to supply a first scan signal to an i-th first scan line, and a second scan signal to an i-th second scan line;

a data driver configured to supply a data signal to a data line;

a sensor connected to a sensing line; and a pixel in an area partitioned by the i-th first scan line, the i-th second scan line, the data line, and the sensing line, and comprising:

a light-emitting element;

a driving transistor configured to control an amount of current supplied to the light-emitting element in response to a voltage of a first node;

a switching transistor coupled between a j-th data line and the first node, and comprising a gate electrode coupled to the i-th first scan line, i and j being natural numbers; and a sensing transistor coupled between a second node, which is between the light-emitting element and the driving transistor, and a k-th sensing line, and comprising a gate electrode coupled to the i-th second scan line, k being a natural number, wherein the sensor is configured to sense deterioration information of the light-emitting element in a state in which the switching transistor and the sensing transistor are turned on, wherein the sensor comprises sensing channels for sensing the deterioration information, at least one of the sensing channels comprising:

a sensing capacitor comprising a first electrode coupled to a base power source, and a second electrode;

a first switch coupled between the k-th sensing line and an initialization power source, and configured to be maintained in a turned-on state for a part of a period in which the first scan signal and the second scan signal are supplied, and to be set to a turned-off state for a remainder of the period in which the first scan signal and the second scan signal are supplied; and a second switch coupled between the k-th sensing line and the second electrode of the sensing capacitor, and wherein the scan driver is further configured to start supplying the first scan signal and the second scan signal at a same time, and stop supplying the second scan signal before stopping the first scan signal after the deterioration information is sensed.

2. The display device of claim 1, wherein the data driver is configured to supply a voltage of a reference power source having a voltage value at which the driving transistor is turned on to the j-th data line during a period in which the deterioration information is sensed.

3. The display device of claim 2, wherein the voltage value of the reference power source is set so that the light-emitting element emits light due to a current from the driving transistor when the voltage of the reference power source is supplied to the first node.

4. The display device of claim 1, wherein the i-th first scan line and the i-th second scan line comprise a same scan line.

5. The display device of claim 1, further comprising an analog-to-digital converter coupled to the second electrode of the sensing capacitor.

6. The display device of claim 1, wherein the deterioration information of the light-emitting element is configured to be sensed at a corresponding time point during a period in which the first switch is set to the turned-off state.

7. The display device of claim 1, wherein the second switch is configured to be turned off during the part of the period in which the first scan signal and the second scan signal are supplied, and to be turned on during the remainder of the period in which the first scan signal and the second scan signal are supplied.

8. The display device of claim 1, wherein a period in which the second switch is turned on partially overlaps a period in which the first switch is turned on, and wherein the second switch is configured to be maintained in the turned-on state for the remainder of the period in which the first scan signal and the second scan signal are supplied.

9. A display device comprising:

a scan driver configured to drive first scan lines and second scan lines;

a data driver configured to drive data lines;

a sensor configured to drive sensing lines; and a pixel comprising a light-emitting element configured to receive a voltage of an initialization power source such that the light-emitting element does not emit light during a part of a period in which a voltage of a reference power source is supplied from a corresponding data line, a driving transistor configured to control an amount of current supplied to the light-emitting element, a switching transistor coupled between the corresponding data line among the data lines and the driving transistor, and a sensing transistor coupled between the light-emitting element and a corresponding sensing line among the sensing lines, wherein the sensor is configured to sense deterioration information of the light-emitting element in a state in which the switching transistor and the sensing transistor are turned on, wherein the sensor comprises sensing channels for sensing the deterioration information, at least one of the sensing channels comprising:

a sensing capacitor comprising a first electrode coupled to a base power source, and a second electrode;

a first switch coupled between the corresponding sensing line and the initialization power source; and a second switch coupled between the corresponding sensing line and the second electrode of the sensing capacitor, and wherein the scan driver is further configured to concurrently turn on the switching transistor and the sensing transistor, and turn off the sensing transistor before turning off the switching transistor after the deterioration information is sensed.

10. A method of driving a display device, the method comprising:

supplying a voltage of a reference power source to a first node through a data line and a switching transistor;

supplying a voltage of an initialization power source to a first electrode of a light-emitting element such that the light-emitting element does not emit light during a part of a period in which the voltage of the reference power source is supplied;

supplying a current from a driving transistor to the light-emitting element in response to the voltage of the reference power source supplied to the first node during a remainder of the period in which the voltage of the reference power source is supplied;

sensing, with a sensor, a voltage applied to the first electrode of the light-emitting element through a sensing transistor coupled between a sensing line and the first electrode of the light-emitting element by maintaining the switching transistor and the sensing transistor in a turned-on state, wherein the sensor comprises sensing channels for sensing the voltage applied to the first electrode of the light-emitting element, at least one of the sensing channels comprising:

a sensing capacitor comprising a first electrode coupled to a base power source, and a second electrode;

a first switch coupled between the sensing line and the initialization power source; and a second switch coupled between the sensing line and the second electrode of the sensing capacitor; and concurrently turning on the switching transistor and the sensing transistor, and turning off the sensing transistor before turning off the switching transistor after sensing the voltage applied to the first electrode of the light-emitting element.

11. The method of claim 10, further comprising generating light by the light-emitting element by supplying the current from the driving transistor to the light-emitting element.

* * * * *